United States Patent [19]

Szajna

[11] Patent Number: 4,502,607
[45] Date of Patent: Mar. 5, 1985

[54] BULGE RESISTANT BOTTLE BOTTOM

[75] Inventor: John L. Szajna, Norridge, Ill.

[73] Assignee: Continental Plastic Containers, Inc., Stamford, Conn.

[21] Appl. No.: 506,472

[22] Filed: Jun. 21, 1983

[51] Int. Cl.³ .............. B65D 6/34; B65D 8/04; B65D 8/06; B65D 8/08

[52] U.S. Cl. ................. 220/70; 215/1 C; 220/66; 264/523; 264/531; 425/531; 425/522

[58] Field of Search .......... 264/531, 532, 523, 522, 264/540; 425/522, 525, 531, 532, 387.1; 215/1 C; 220/70, 66

[56] References Cited

U.S. PATENT DOCUMENTS

| | | | |
|---|---|---|---|
| 3,417,892 | 12/1968 | Schweiger | 425/522 |
| 3,520,010 | 7/1970 | Dockery | 18/5 |
| 3,592,885 | 7/1971 | Goins et al. | 264/98 |
| 3,817,676 | 6/1974 | Seefluth | 425/387 |
| 3,865,531 | 2/1975 | Moore et al. | 425/387 |
| 4,026,984 | 5/1977 | Seefluth | 264/89 |
| 4,174,782 | 11/1979 | Obsomer | 215/1 C |
| 4,231,483 | 11/1980 | Dechenne et al. | 215/1 C |

FOREIGN PATENT DOCUMENTS 160616 10/1982 Japan ................... 264/531

*Primary Examiner*—Jay H. Woo
*Assistant Examiner*—Timothy W. Heitbrink
*Attorney, Agent, or Firm*—Charles E. Brown

[57] ABSTRACT

This relates to a bottom construction for a blow molded container wherein a central portion of the bottom is axially inwardly recessed and pushed in and where, in the forming of the central portion, there are two axially offset halves so as to define an upstanding rib. The rib sufficiently reinforces the recessed bottom portion against inversion even when the wall thickness of the bottle or container is reduced.

14 Claims, 6 Drawing Figures

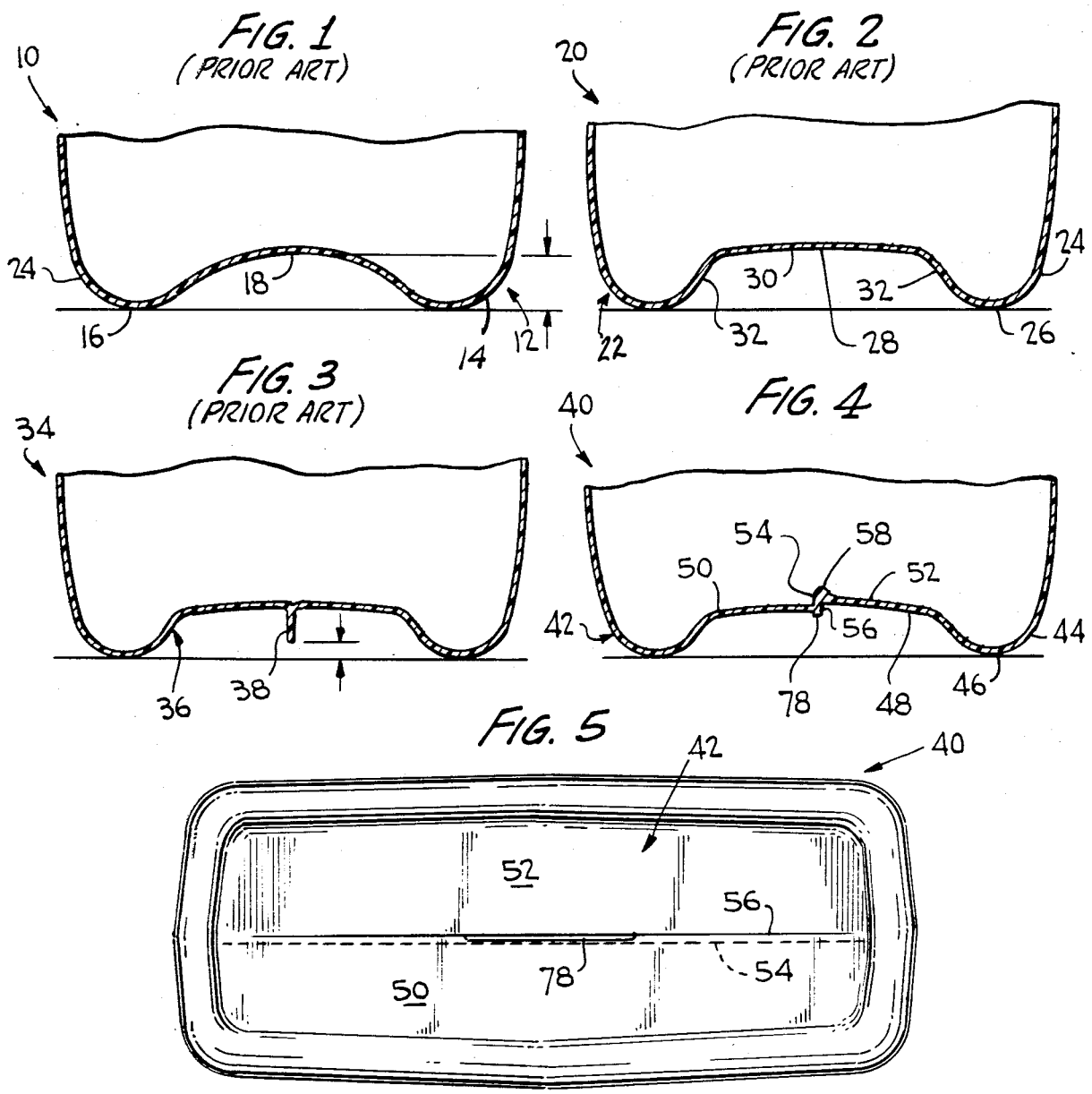
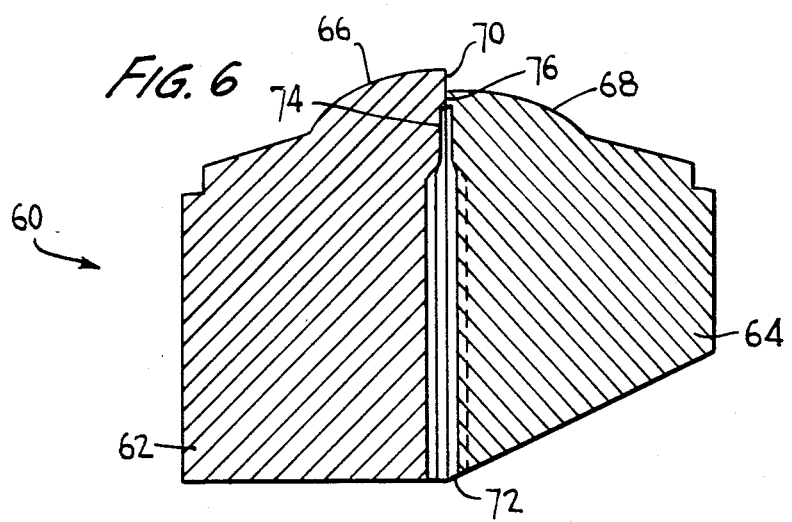

BULGE RESISTANT BOTTLE BOTTOM

This invention relates in general to new and useful improvements in plastic bottles, and more particularly to bottle bottoms having recessed central portions.

As the walls of plastic bottles and like containers decrease in thickness, there is generally a like decrease in thickness of the bottom of such bottles. This invention relates to the reinforcement of a bottle bottom so as to prevent bulging.

With the above and other objects in view that will hereinafter appear, the nature of the invention will be more clearly understood by reference to the following detailed description, the appended claims, and the several views illustrated in the accompanying drawings.

In the drawings:

FIG. 1 is a sectional view taken through the bottom of a prior art champagne bottle, and shows the cross section thereof.

FIG. 2 is a sectional view through a prior art bottle bottom similar to the champagne bottom, but having steeper angles on the recessed portion thereof.

FIG. 3 is another sectional view taken through a prior art bottle bottom wherein the central portion is provided with a depending rib to effect reinforcement.

FIG. 4 is a further sectional view taken through a bottle bottom incorporating a reinforcing rib in accordance with this invention.

FIG. 5 is a bottom plan view of the bottle bottom of FIG. 4, and shows the general outline thereof.

FIG. 6 is a transverse vertical sectional view taken through a bottom defining component of a blow mold with which the bottle bottom of FIG. 4 is formed.

FIGS. 1–3 disclose various efforts to prevent bottom bulge when the wall thickness of the container body is reduced so as not to have sufficient strength to be self-sustaining under load. With particular reference to FIG. 1, there is illustrated the conventional so-called champagne bottom wherein a central part of a bottle bottom is generally pushed up into the bottle and because of the reverse curvature thereof, resists inversion. The bottle of FIG. 1 is identified by the numeral 10 with the bottom being generally identified by the numeral 12 and including a part-spherical outer part 14, a reversely turned intermediate part 16, and an inverted central part 18. The bottom 12 does provide increased strength, but is subject to inversion of the central portion 18 under load.

An alternative bottle construction, generally identified by the numeral 20, is illustrated in FIG. 2. The bottle bottom is generally identified by the numeral 22 and is particularly useful when the bottle is of an elongated cross section. The bottom 22 includes a downwardly and inwardly rounded outer portion 24 which terminates in a reversely turned intermediate portion 26 which, in turn, terminates in an inverted central portion 28. As opposed to the generally hemispheric outline of the central portion 18 of the bottom 12, the central portion 28 is elongated and has a generally flatly curved axially inner part 30 and generally vertical end parts 32. It will be seen that the bottom construction 22, whether the bottle is circular in cross section or of an elongated cross section, will have a greater strength as compared to a flat bottom. However, the steep angle of the walls results in a tendency toward creases on the lower side walls of the bottom.

In FIG. 3 there is illustrated a bottle 34 having a bottom generally identified by the numeral 36. The bottom 36 may be of a cross section similar to that of FIG. 2 and is provided with a centrally located depending rib 38. The rib 38 normally will be formed of the pinched off end portion of a preform and will extend along the mold parting line. This bottom construction is usable both with respect to circular cross sectional and elongated cross sectional bottles. It will be apparent that the bottom construction 36 has greater strength than the bottom constructions 12 and 22. On the other hand, this bottom construction has the deficiency in that should there be limited inversion of the bottom, the rib 38 will extend down below the supporting surface of the bottom and result in a rocker.

In accordance with this invention, there is provided a bottom construction which includes a reinforcing rib, but wherein the rib extends internally into the bottle. Such a bottle construction is illustrated in FIG. 4 and is generally identified by the numeral 40. The bottle 40 is provided with a bottom construction 42. Although the bottom construction 42 is feasible for circular cross-sectional bottles, it is particularly adaptable to elongated cross-sectional bottles wherein the rib extends longitudinally of the bottom.

The bottom 42 is provided with a downwardly and radially inwardly turned outer part 44 which terminates in a reversely turned intermediate part 46. The bottom 42 also includes a recessed central part 48. It is to be noted that the central part 48 includes generally two halves 50, 52 with the halves being divided along the length of the bottle bottom. The half 52 is axially offset inwardly of the bottle with respect to the half 50 so as to define on the half 50 an axial rib 54 which extends into the bottle 50 and generally longitudinally of the bottom.

It is to be noted that the rib 54 will be automatically formed due to the offset of the two halves 50, 52 and will have an outer face 56 disposed below the half 52 and generally facing the half 52. The rib 54 will be of a materially greater thickness than the adjacent part of the half 50.

The rib 54 has at its axially inner end an extension 58 which is part of the half 52. The extension 58 is also of an increased thickness as compared to the thickness of the adjacent portion of the half 52 and is generally rounded in cross section.

It is to be understood that by forming the rib 54 between the bottom halves 50, 52 and by suitably recessing the bottom half 50, the rib 54 does not bottom out under load so as to present a rocker. In addition, instead of the rib 54 being solely an axially extending element, it is provided with the extension 58 which is at right angles thereto and thereby provides an angle construction which resists distortion both axially and radially.

As will be readily apparent from FIG. 5, when the bottle 40 is of an elongated cross section the rib 54 extends in the direction of elongation and thus provides for the required stiffness of the bottom. By stiffening the bottom, particularly the central part thereof, from inversion, it will be seen that the wall of the bottle or container may be reduced in thickness and still have the required bottom strength.

Reference is now made to FIG. 6 wherein there is illustrated in cross section a bottom component of a blow mold from which the bottle bottom 40 is formed. The mold component is generally identified by the numeral 60 and includes two longitudinally adjacent halves 62, 64. The half 62 is provided with a bottom defining surface 66 which is axially offset from a similar bottom defining surface 68 of the half 64. The offset being into the interior of the intended bottle. The offsetting of the bottom defining surface 66 from the bottom defining surface 68 results in an axial surface 70 on the half 62 which extends axially inwardly of the surface 68 and generally faces the surface 68.

The relationship of the surfaces 66, 68 automatically results in the bottom configuration 42 of FIG. 4 together with the thickened rib 54 and a thickened portion 58.

It is to be noted that the halves 62, 64 are recessed in central parts thereof in opposing relation to define a cavity 72 for a flattened end portion of a preform. This cavity reduces in width or depth at 74, and finally there is a pinch-off part 76 immediately adjacent the surface 70. Thus, in the resultant bottom 42, there will be a pinch-off surface 78 in alignment with and axially outwardly of the rib 54. This is best shown in FIG. 5.

As pointed out above, the bottom construction 42 is primarily intended for use in a bottom or other container of elongated cross section. However, it may also be used in conjunction with a bottle or container of circular or substantially circular cross section.

Although only a preferred embodiment of the container bottom construction and mold component for forming the same have been specifically illustrated and described herein, it is to be understood that minor variations may be made in the bottom construction and mold component without departing from the spirit and scope of the invention as defined by the appended claims.

I claim:

1. A bottom construction of a blow molded plastic container, said bottom construction comprising an outer reversely turned portion and an inner axially recessed portion, said inner portion including opposed halves integrally joined together with said opposed halves being axially offset to define a stepped bottom part having an axial rib extending across said bottom and forming a reinforcement for said inner axially recessed portion to prevent inversion of said inner portion from its axially recessed position.

2. A bottom construction according to claim 1 wherein said bottom construction is elongated in the direction of said rib.

3. A bottom construction according to claim 1 wherein said axial rib is part of one of said inner portion halves and of a greater thickness than adjacent parts of said one half.

4. A bottom construction according to claim 1 wherein said axial rib has connected to an axially inner edge of said rib an axially inner portion extending the axial length of said rib and generally at right angles to said rib.

5. A bottom construction according to claim 4 wherein said axially inner portion is generally rounded in cross section.

6. A bottom construction according to claim 1 wherein said axial rib is part of one of said inner portion halves, said axial rib has connected to an axially inner edge of said rib an axially inner portion extending the length of said rib and generally at right angles to said rib, and said axially inner portion forms part of the other of said inner portion halves.

7. A bottom construction according to claim 6 wherein said axially inner portion is generally rounded in cross section.

8. A bottom construction according to claim 1 wherein there is visual evidence of a preform pinch-off along an axial outer edge of said rib.

9. A blow molded bottom component, said bottom component having a central bottom defining portion divided into two halves along a longitudinal line, and said two halves being axially offset along said longitudinal line to define a stepped bottom defining surface on opposite sides of said longitudinal line.

10. A bottom component according to claim 9 wherein an axially innermost of said two halves has along an axial extension of said longitudinal line a longitudinally extending axial surface generally facing the other of said two halves and being axially offset relative thereto.

11. A bottom component according to claim 9 wherein said bottom component is formed in two halves joined along an axial parting line aligned with said longitudinal line.

12. A bottom component according to claim 11 wherein said two halves have opposing surfaces on opposite sides of said axial parting line in part defining a cavity for a preform end portion and in part defining a preform pinch-off surface.

13. A bottom component according to claim 11 wherein said two halves have opposing surfaces on opposite sides of said axial parting line in part defining a cavity for a preform end portion and in part defining a preform pinch-off surface, said preform pinch-off surface being immediately axially adjacent said longitudinal line.

14. A bottom component according to claim 11 wherein an axially innermost of said two halves has a longitudinally extending axial surface along an axial planar extension of said parting line generally facing the other of said two halves and being axially offset relative thereto.

* * * * *